United States Patent
Lowell

[11] Patent Number: 6,155,947
[45] Date of Patent: Dec. 5, 2000

[54] SPEED-SENSITIVE DIFFERENTIAL

[75] Inventor: Jeffrey Lowell, Ventura, Calif.

[73] Assignee: McLaren Automotive Group, Inc., Livonia, Mich.

[21] Appl. No.: 09/320,632

[22] Filed: May 26, 1999

[51] Int. Cl.[7] .................................................. F16H 48/22
[52] U.S. Cl. .............................. 475/88; 475/90; 475/96; 475/233
[58] Field of Search ................... 475/88, 89, 90, 475/96, 233

[56] References Cited

U.S. PATENT DOCUMENTS

| | | |
|---|---|---|
| 2,949,792 | 8/1960 | Smith . |
| 3,724,289 | 4/1973 | Kennicutt . |
| 3,987,689 | 10/1976 | Engle ........................................ 475/88 |
| 4,012,968 | 3/1977 | Kelbel ....................................... 475/88 |
| 5,059,160 | 10/1991 | Raniero . |
| 5,299,986 | 4/1994 | Fabris et al. . |
| 5,310,388 | 5/1994 | Okcugolu et al. . |
| 5,536,215 | 7/1996 | Shaffer et al. . |
| 5,595,214 | 1/1997 | Shaffer et al. . |
| 5,611,746 | 3/1997 | Shaffer . |
| 5,616,096 | 4/1997 | Hagiwara ................................ 475/249 |
| 5,888,163 | 3/1999 | Shaffer et al. ........................... 475/88 |
| 5,938,555 | 8/1999 | Leeper ..................................... 475/88 |
| 5,938,556 | 8/1999 | Lowell ..................................... 475/89 |

*Primary Examiner*—Rodney H. Bonck
*Assistant Examiner*—Ha Ho
*Attorney, Agent, or Firm*—Bliss McGlynn, P.C.

[57] ABSTRACT

A speed-sensitive, limited-slip, geared differential mechanism for transferring driving torque to each of two torque output shafts. Side gears located in a planetary gear carrier housing, one side gear being drivably connected to one pump member of a positive displacement pump and the planetary gear carrier being connected to another pump member. The pump is supplied with silicone fluid from a fluid reservoir. The pump creates a hydrostatic torque bias when differential motion of the side gears occurs as silicone fluid circulates through the pump.

5 Claims, 4 Drawing Sheets

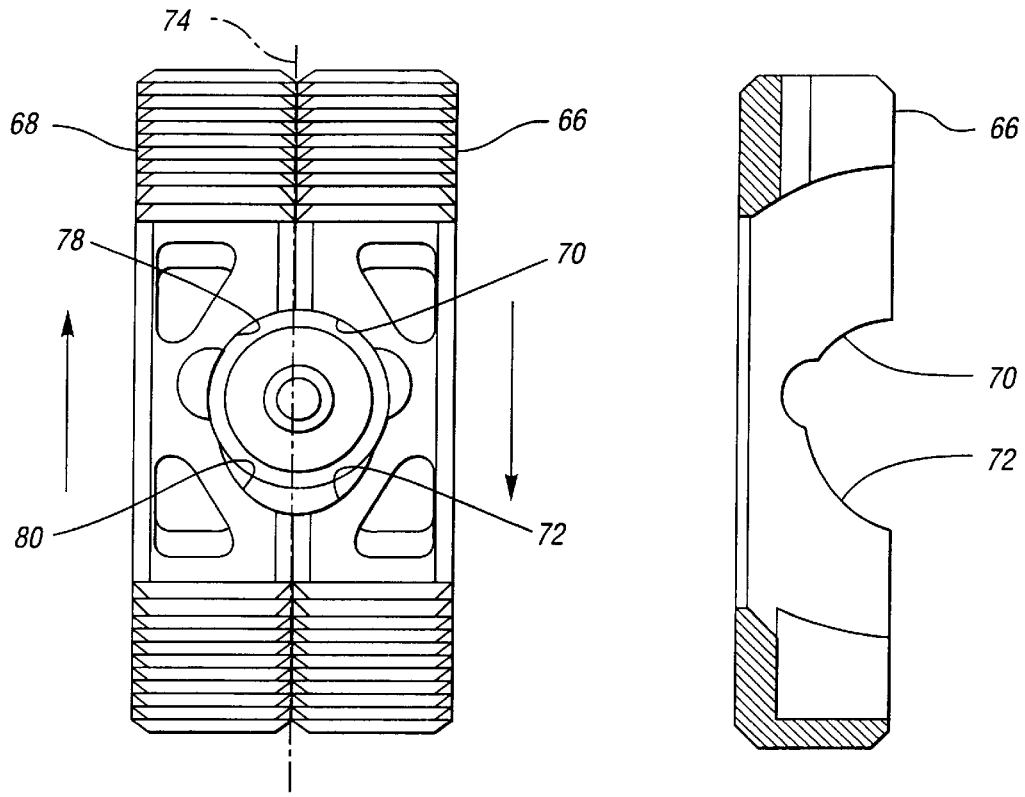
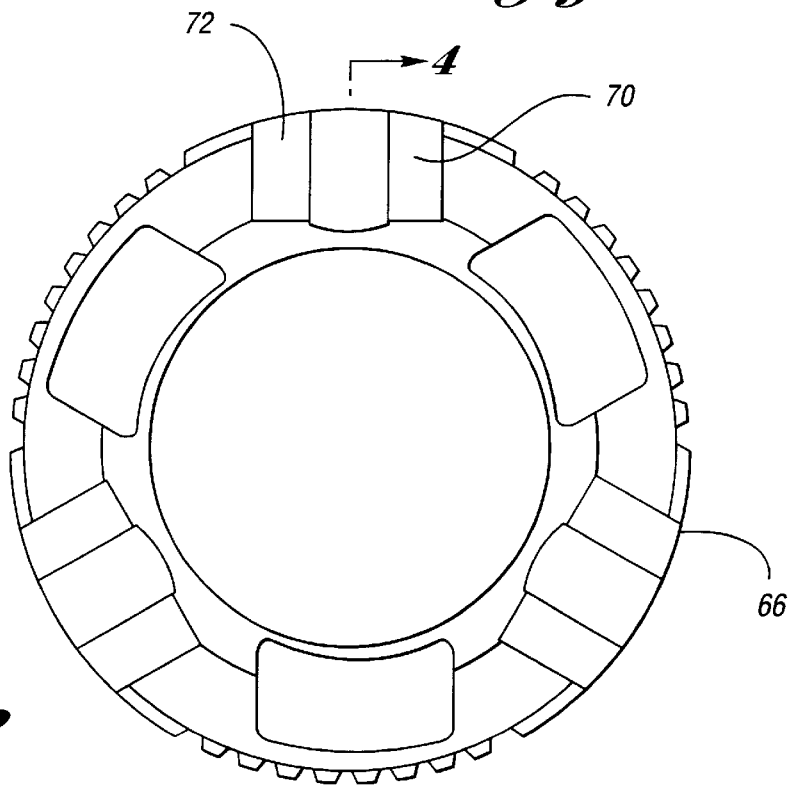

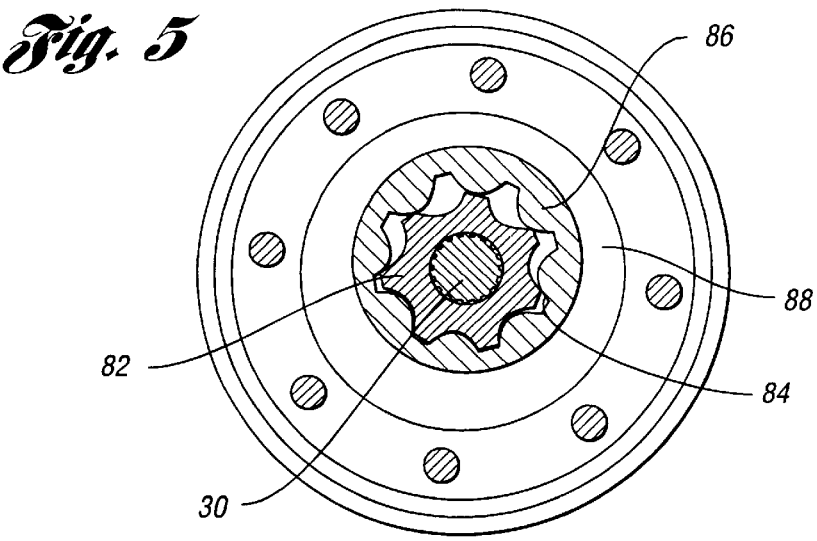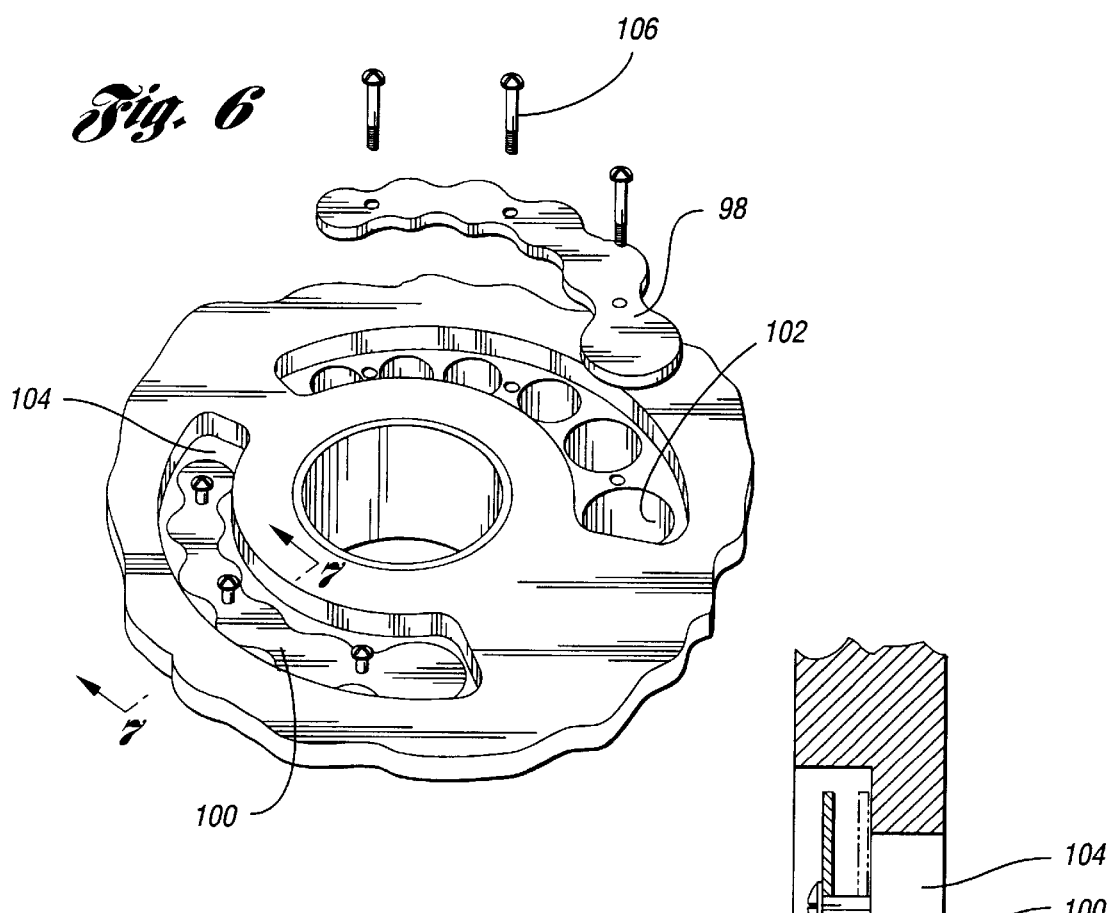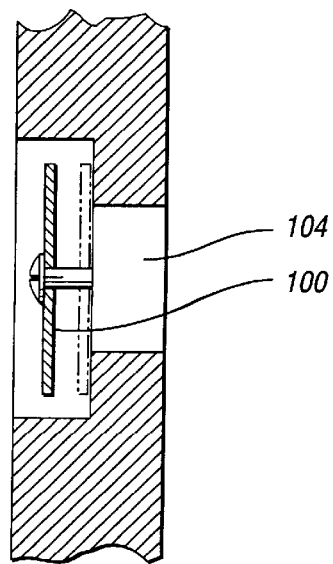

6,155,947

SPEED-SENSITIVE DIFFERENTIAL

TECHNICAL FIELD

The invention relates to differential gear mechanisms for transferring torque from a driving shaft to each of two traction wheels for a vehicle.

BACKGROUND ART

Copending U.S. patent application Ser. No. 09/114,505, filed Jul. 13, 1998, now U.S. Pat. No. 5,938,556, entitled "Differential Speed-Sensitive and Torque-sensitive Limited Slip Coupling" discloses a geared differential mechanism with friction clutches for establishing a mechanical torque bias and with a Gerotor pump for establishing a speed-sensitive torque bias. This copending patent application is assigned to the assignee of this invention. The clutches are enclosed in a differential carrier that rotatably supports differential pinions, the pinions engaging coaxially disposed side gears. Each side gear is connected drivably to a separate one of a pair of driven shafts. Torque reaction forces acting on the side gears activate pressure rings which, in turn, energize the clutches. The magnitude of the clutch-engaging force for each of the two clutches is proportional to the torque delivered to the associated driven shaft.

The Gerotor pump has one pump member connected drivably to the differential carrier. A companion pump member is connected drivably to one of the driven shafts. When differential motion between the carrier and the one driven shaft occurs, the pumping elements rotate, one with respect to the other, thereby delivering fluid under pressure through an internal fluid flow circuit with a controlled flow restriction. Fluid is distributed to the Gerotor pump through an inlet port in communication with an external fluid supply, which typically would be located in the axle housing for the vehicle. Upon relative rotation of the pump members, fluid is displaced to a pump outlet port and then recirculated through the pump. The hydrostatic resistance provided by the pump members establishes a speed-sensitive torque bias because the energy applied to the fluid in the closed pump circuit is determined by the relative speeds of the side gear and the differential carrier. The total torque bias for the gear differential mechanism is the sum of the mechanical torque bias and the speed-sensitive torque bias.

The differential carrier is driven by a crown gear or a ring gear, which is drivably engaged with a drive pinion. The combined torque bias provided by the clutches and the Gerotor pump improves the drivability of the vehicle by improving the steering response to a steering effort applied by the vehicle operator and by reducing the possibility of understeering.

The hydrostatic torque bias component of the total torque bias is proportional to the relative speeds of the pump members regardless of the magnitude of the torque being transmitted through the differential.

It is necessary in a differential mechanism of this kind to provide an external fluid source for the Gerotor pump. A relatively large volume of fluid and circulation of fluid through the pump circuit are required in order to ensure that the fluid will not be overheated when the differential mechanism operates continuously for a relatively long period. The necessity for an external fluid supply conduit for the Gerotor pump makes it necessary, furthermore, to increase the size of the differential mechanism and to increase the complexity of the design because of the extended fluid flow path between the pump and the axle housing.

DISCLOSURE OF INVENTION

The geared differential mechanism of the invention is capable of delivering torque from a driving member to each of two driven members. Side gears are connected to the driven members.

A carrier housing encloses the side gears and planetary pinions that engage the side gears. A pair of friction disk clutch packs have friction disks connected to the side gears and the carrier housing.

A pair of pressure rings in the carrier housing surrounds the side gears, each pressure ring having ramp surfaces for transferring axial thrust forces to the clutch packs to create a torque-sensitive bias.

A positive displacement pump has one pump member connected to the carrier housing and a second pump member connected to a side gear. Silicone fluid in a fluid reservoir formed in the carrier housing is distributed from the fluid reservoir and a fluid inlet port for the pump as fluid circulates through the pump to create a speed-sensitive bias.

The differential mechanism of the invention overcomes the disadvantages of using an external Gerotor fluid supply and a complex fluid supply circuit extending to the Gerotor pump inlet. It does this by providing a reservoir which is filled with silicone fluid, the reservoir being situated within an end cap on the differential carrier in close proximity to the inlet and outlet ports of the Gerotor pump.

Preferably, the fluid chamber that contains the silicone fluid is in the form of an annulus, which is completely filled with silicone fluid. The silicone fluid is pressurized with a continuous pressure developed by a movable piston that forms one wall of the annulus that contains the silicone fluid. The piston is spring-biased to effect a continuous pressure to avoid cavitation of the silicone fluid as it circulates through the Gerotor pump. This ensures that the inlet port of the Gerotor pump is continuously supplied with silicone fluid during operation of the pump, as the differential mechanism develops a speed-sensitive torque bias.

The silicone fluid has a thermal stability that is higher than the thermal stability of the fluid in the axle housing. Continuous differential action, in a prolonged turning maneuver of the vehicle, will develop internal heat in the silicone fluid, but that does not adversely affect the performance of the fluid since the effective operating temperature range for the silicone fluid is substantially greater than the effective operating range that would exist for conventional rear axle fluids, as in the case of the differential mechanism shown in the previously described copending patent application.

As fluid is circulated from the pump inlet to the pump outlet, it passes through a crossover passage having a controlled flow restriction.

BRIEF DESCRIPTION OF DRAWINGS

FIG. 2 is a top view of a pair of pressure rings that are assembled in the carrier housing of the differential mechanism of FIG. 1;

FIG. 3 is an end view of one of the pressure rings shown in FIG. 2;

FIG. 4 is a cross-sectional view of the pressure ring of FIG. 3 as seen from the plane of section line 4—4 of FIG. 3;

FIG. 5 is a cross-sectional view of the Gerotor pump as seen from the plane of section line 5—5 of FIG. 1;

FIG. 6 is a perspective view of the flow control valve for the flow inlet and flow outlet ports of the pump of FIG. 5;

FIG. 7 is a cross-sectional view of a valve port and flow control valve as seen from the plane of section line 7—7 of FIG. 6;

BEST MODE FOR CARRYING OUT THE INVENTION

Figure 1:
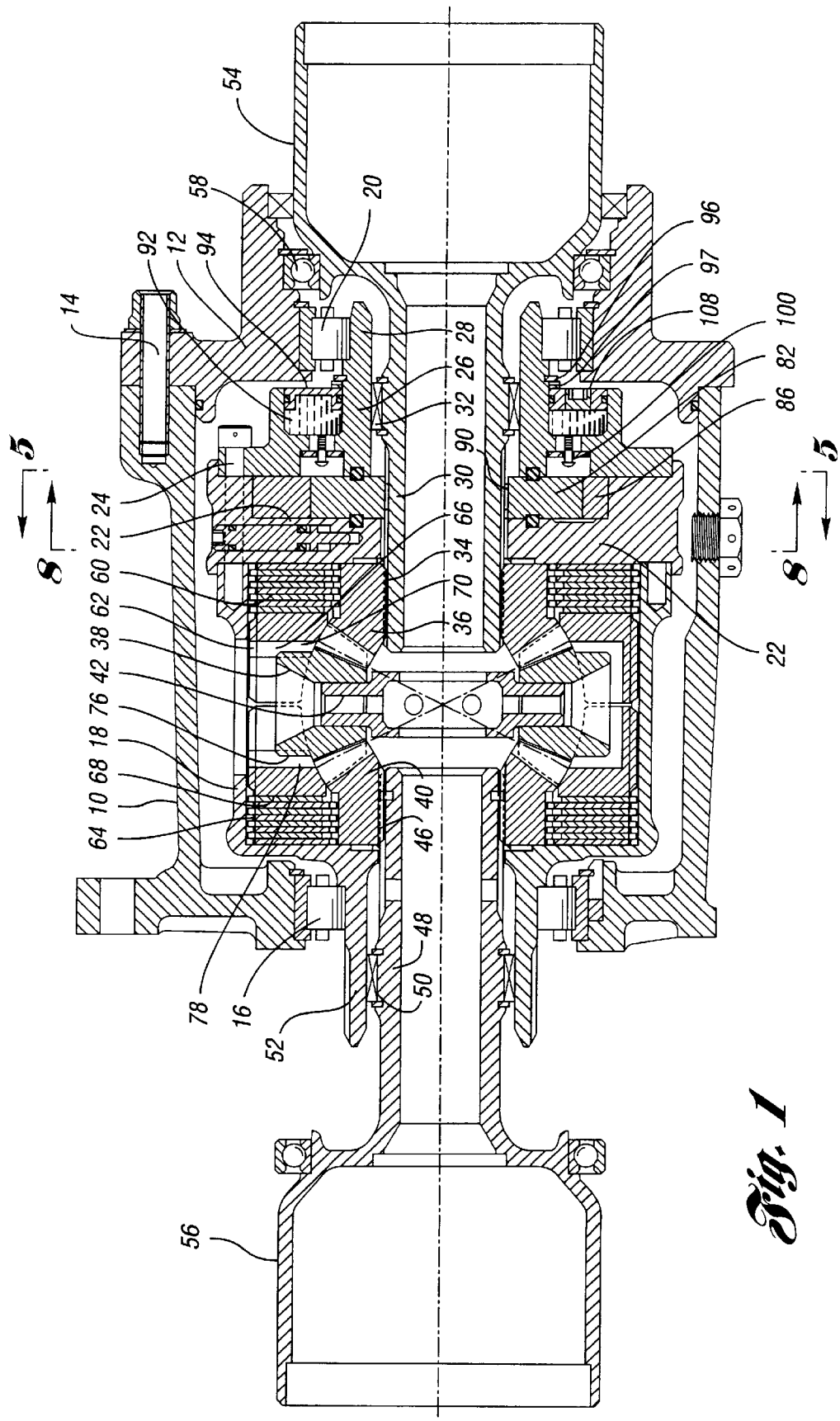
FIG. 1 is a cross-sectional assembly view of a differential mechanism having a speed-sensitive torque bias feature with an internal silicone fluid reservoir.

The cross-sectional view of FIG. 1 shows a differential housing 10 having an end bearing plate 12 secured to the right end to cover the opening at the right end. Plate 12 is secured to the housing 10 by threaded fasteners 14. The housing 10 has a first bearing opening that receives bearing 16, which rotatably supports differential carrier housing 18. End bearing plate 12 has a bearing opening for bearing 20, which rotatably supports a carrier housing end plate 22. Plate 22 is secured to the opening at the right end end of the carrier housing 18, threaded fasteners 24 being provided for this purpose. End member 26 is secured to the closure plate 22 by the threaded fasteners 24. Member 26 defines a sleeve shaft 28, which is journaled by bearing 20 in the bearing opening in end plate 12 for the differential housing. Torque output member 30 is journaled in the sleeve shaft 28 by bearing 32. Output member 30 is splined at 34 to a first side gear 36.

Differential pinions 38 engage side gear 36 as well as a companion side gear 40. Pinions 38 are journaled on a spider member or pinion shaft member 42. Side gear 40 is splined at 46 to a second torque output member 48, the latter being journaled by bearing 50 in sleeve shaft 52, which forms a part of the carrier housing 18.

Torque output members 30 and 48 are connected respectively to universal joints, which include a universal joint member 54 and 56, respectively. Member 54 is journaled by bearing 58 in the end wall 12.

A first friction disk pack 60 includes clutch separator plates splined to internal spline teeth 62 in the carrier housing 18. Internally splined clutch friction disks are drivably connected to side gear 36 as shown.

A second clutch pack 64 includes externally splined clutch separator plates that are drivably connected to internal spline teeth 62 of the carrier housing 18. Internally splined clutch friction disks of the clutch pack 64 are drivably splined to the second side gear 40.

A first pressure ring 66 is situated between pinions 38 and the clutch pack 60. Similarly, a second pressure ring 68 is situated between pinions 38 and clutch pack 64.

As best seen in FIG. 2, pressure ring 66 is formed with a first cam surface 70 and a second cam surface 72. As indicated, the slope of the cam surface 70 with respect to center line 74 is greater than the corresponding slope of the cam surface 72 with respect to the center line 74.

As best seen in FIG. 1, pinion 38 has a radially extending circular surface, which is engageable with the cam surfaces 70 and 72. When the differential mechanism is delivering torque through the pinions 38 and the side gears 36 and 40, an axially directed thrust force is created on the pressure ring 66 as the pressure ring 66 engages the friction disks of the clutch pack 60. In a similar fashion, the thrust ring 68 has cam surfaces 78 and 80 that correspond respectively to cam surfaces 70 and 72 of the thrust ring 66. Cam surfaces 80 are characterized by a steeper slope relative to the center line 74 than the slope formed by cam surfaces 78.

The end plate 22 defines a pump cavity, which receives an internal Gerotor pump member with external teeth, as shown at 82 in FIG. 5. The external teeth register with internal tooth spaces 84 for external Gerotor pump member 86. In known fashion, Gerotor pump element 86 is rotatably mounted eccentrically with respect to the axis of member 82 within an eccentric ring 88.

Pump member 82 is splined to output shaft 30 as shown at 90 in FIG. 1.

The end plate 26 defines a silicone fluid supply chamber 92. The chamber 92 is annular and surrounds the shaft 28. An annular piston 94 is situated within the annulus that defines the silicone chamber 92. It is held axially fast by a snap-ring 96. A circular wave spring 97 is located between the snap-ring 96 and the piston 94 so that a continuous spring force is applied to the piston, thereby creating an inlet pressure that is greater than atmospheric.

A pair of disk valves shown at 98 and 100 controls the transfer of fluid from the silicone fluid supply chamber 92 to the inlet ports 102 and 104 for the pump. The valves 98 and 100 are best seen in FIG. 6. FIG. 7 shows a detailed view of valve 100, which may be substantially identical to the valve 98.

The valve 100 comprises a plate that is mounted on mounting pins 106 secured to the end plate 26. Port 104 permits flow of silicone fluid from the annular silicone chamber 92 to the inlet port. FIG. 7 shows the valve 100 in the open position by means of full lines. The dotted line representation of valve 100 in FIG. 7 designates the closed position.

Annular piston 94 is provided with an opening that is closed by a plug 108 as seen in FIG. 1. The plug can be removed to permit charging of the storage chamber 92 with silicone fluid. After the chamber 92 is filled, the plug is inserted, thereby sealing the chamber 92.

Silicone fluid passes through the pump circuit from the inlet port to the outlet port when relative rotation occurs between the carrier housing 18 and the torque output member 30. This establishes hydrostatic resistance to relative motion of the side gears, thus providing a hydrostatic torque bias.

Figure 8:
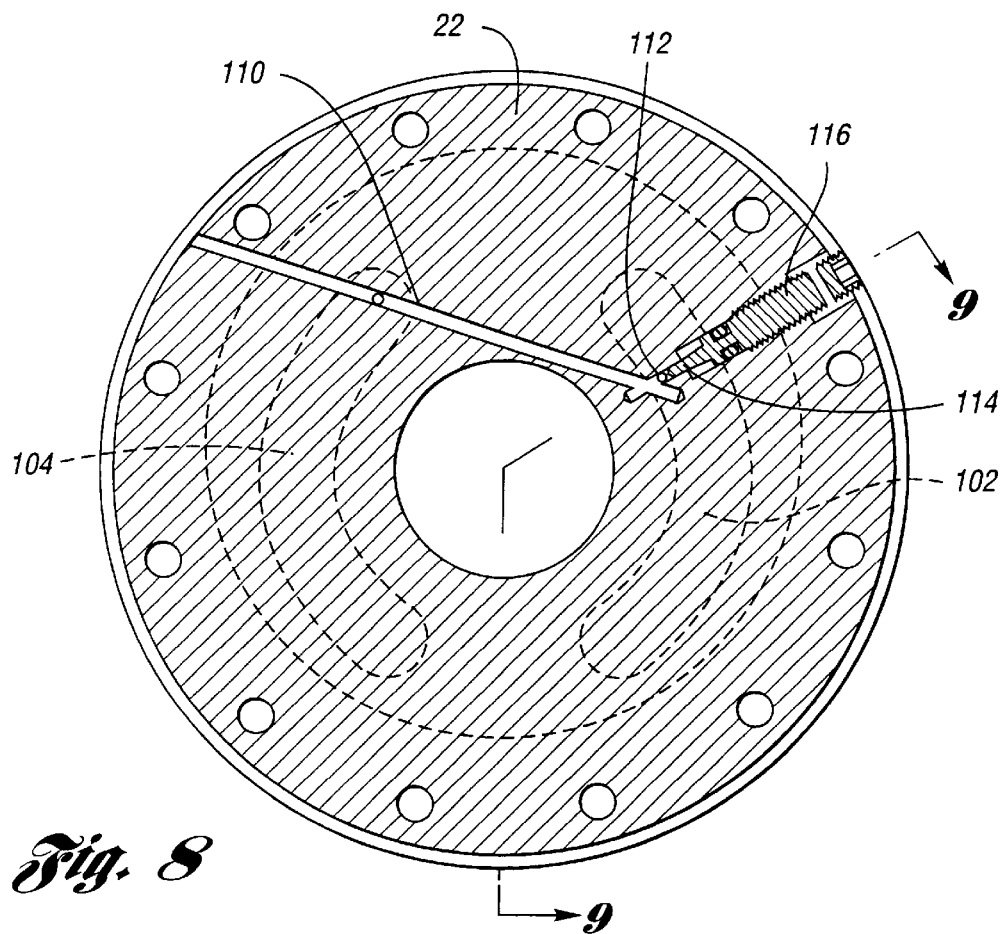
FIG. 8 is a cross-sectional view taken along the plane of section line 8—8 of FIG. 1.
Figure 9:
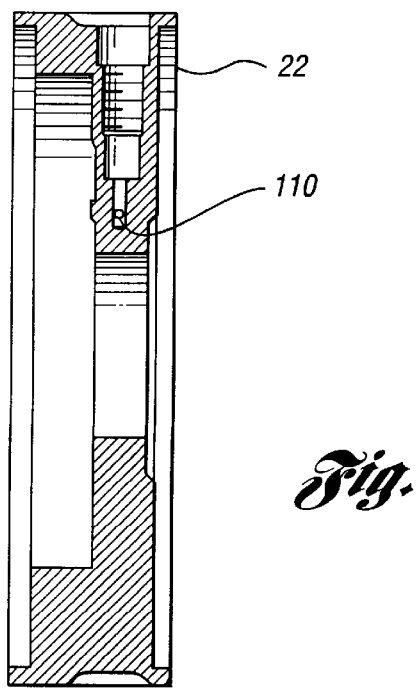
FIG. 9 is a cross-sectional view taken along the plane of section line 9—9 of FIG. 8.

FIG. 8 shows a crossover passage in the end plate 22, as seen at 110 in FIG. 8. The crossover passage 110 extends from port 102 to port 104. It communicates with a flow restricting port 112, which registers with an adjustable valve element 114. The valve element 114 is carried by or is formed integrally with an adjustable threaded stem 116 located in an internally threaded opening in the end plate 22. The flow resistance provided by the valve 114 can be tailored to increase or decrease the hydrostatic torque bias.

Unlike prior art designs of the kind described in the copending patent application previously identified, the annular chamber 92 defines a self-contained reservoir for the silicone fluid. There is no need for an external fluid flow passage and associated passage structure, nor is there a need for a fluid supply fitting to establish a fluid supply for the pump. This simplifies the overall design and reduces the complexity of the design. It also provides an economy of space.

Although a preferred embodiment of the invention has been disclosed, it is intended that alternative constructions and modifications can be made without departing from the scope of the invention. All such modifications and alternative designs, as well as equivalents, are covered by the following claims.

What is claimed is:

1. A geared differential mechanism for delivering torque from a driving member to each of two driven members;

a first side gear connected drivably to one driven member and a second side gear connected to the other driven member;

planetary pinions engaging drivably each side gear;

a differential carrier housing enclosing the side gears and the planetary pinions;

a pair of friction disk clutch packs, each having a first disk secured drivably to the carrier housing and a second disk secured drivably to one of the side gears;

a pair of pressure rings in the carrier housing surrounding the side gears, a cam recess in the pressure rings defining ramp surfaces, the planetary pinions being disposed axially adjacent the ramp surfaces;

axial thrust forces acting on the side gears being transferred through the pressure rings to the clutch packs thereby creating a torque-sensitive bias in the differential mechanism;

a positive displacement pump comprising a driving pump member connected drivably to one driven member and a driven pump member connected drivably to the carrier housing;

a silicone fluid reservoir formed in said carrier housing, the reservoir being filled with silicone fluid;

a fluid supply port in the carrier housing establishing communication between the fluid reservoir and the inlet port;

a one-way flow control valve in the fluid supply port;

a pump fluid inlet port and a pump fluid outlet port, a fluid delivery passage connecting the inlet and outlet ports whereby pumped fluid recirculates through the pump as the carrier housing and the one driven member rotate relative to each other, whereby a speed-sensitive bias is established in the differential mechanism, the total torque bias being the sum of said torque-sensitive bias and said speed-sensitive bias.

2. The differential mechanism as set forth in claim 1 wherein the reservoir defines an annular cylinder, an annular piston in the cylinder and a spring acting on the annular piston for continuously pressurizing the silicone fluid.

3. A differential mechanism with limited slip capabilities for transferring torque from a driving member to first and second driven members;

first and second side gears connected respectively to the first and second driven members;

at least two planetary pinions engaging drivably to each of the side gears;

a differential carrier housing enclosing the side gears and the planetary pinions;

a positive displacement pump comprising a first pump member connected drivably to said one driven member and a second pump member drivably connected to the carrier housing;

a pump fluid inlet port and a pump fluid outlet port, a fluid delivery passage connecting the inlet and outlet ports whereby pumped fluid recirculates through the pump as the carrier housing and the one driven member rotate relative to each other, whereby a speed-sensitive bias is established in the differential mechanism;

a silicone fluid reservoir formed in the carrier housing, the reservoir being filled with silicone fluid and defining an annular cylinder, an annular piston in the cylinder and a spring acting on the annular piston for continuously pressurizing the silicone fluid;

a fluid supply port in the carrier housing establishing communication between the fluid reservoir and the inlet port; and a one-way flow control valve in said fluid supply port.

4. The differential mechanism as set forth in claim 3 wherein said fluid delivery passage includes an adjustable valve for providing a controlled flow restriction for pumped fluid as fluid is transferred from the inlet port to the outlet port.

5. The differential mechanism as set forth in claim 3 wherein the piston has an opening for filling the reservoir with silicone fluid, and a plug for sealing the opening in the piston.

* * * * *